United States Patent [19]
Molzahn

[11] 3,762,490
[45] Oct. 2, 1973

[54] FINAL DRIVE SYSTEM FOR SELF-PROPELLED VEHICLE

[75] Inventor: Herbert W. Molzahn, Hamilton, Ontario, Canada

[73] Assignee: International Harvester Company, Chicago, Ill.

[22] Filed: Aug. 2, 1972

[21] Appl. No.: 277,184

[52] U.S. Cl.................. 180/70 R, 180/72, 74/792
[51] Int. Cl...................... B60k 17/02, F16h 57/00
[58] Field of Search.................... 180/70 R, 72; 74/792

[56] References Cited
UNITED STATES PATENTS

| | | |
|---|---|---|
| 889,678 | 6/1908 | Hatfield .................. 180/72 |
| 2,362,068 | 11/1944 | Hollmann et al. ............. 180/72 X |
| 3,037,394 | 6/1962 | Watkins .................. 180/70 R X |
| 3,319,493 | 5/1967 | Halls et al. .................. 74/792 |
| 3,584,699 | 6/1971 | Urick .................. 180/72 X |

FOREIGN PATENTS OR APPLICATIONS

| | | |
|---|---|---|
| 1,478,059 | 3/1967 | France .................. 180/70 R |
| 1,003,094 | 9/1965 | Great Britain .................. 180/72 |

Primary Examiner—Robert S. Ward, Jr.
Attorney—Floyd B. Harman

[57] ABSTRACT

A self-propelled chassis for a windrower wherein the chassis includes a pair of ground drive wheels mounted in spaced relation on the forward portion of the chassis frame. The rear of the frame is supported on a single caster wheel. The chassis includes suitable power and transmission units for driving a pair of power input shafts, one for each drive wheel. Each drive wheel is mounted on the outboard side of a vertical section of the frame. Power is transmitted from the power input shaft by a chain and sprocket drive disposed on the outboard side of the vertical frame section to a driven shaft journaled through the frame section. Power is transmitted from the driven shaft to the ground drive wheel by a gear drive disposed on the inboard side of the frame section. The chain and sprocket drive and the gear drive are enclosed by respective removable housings defining fluid reservoirs for the drives.

8 Claims, 5 Drawing Figures

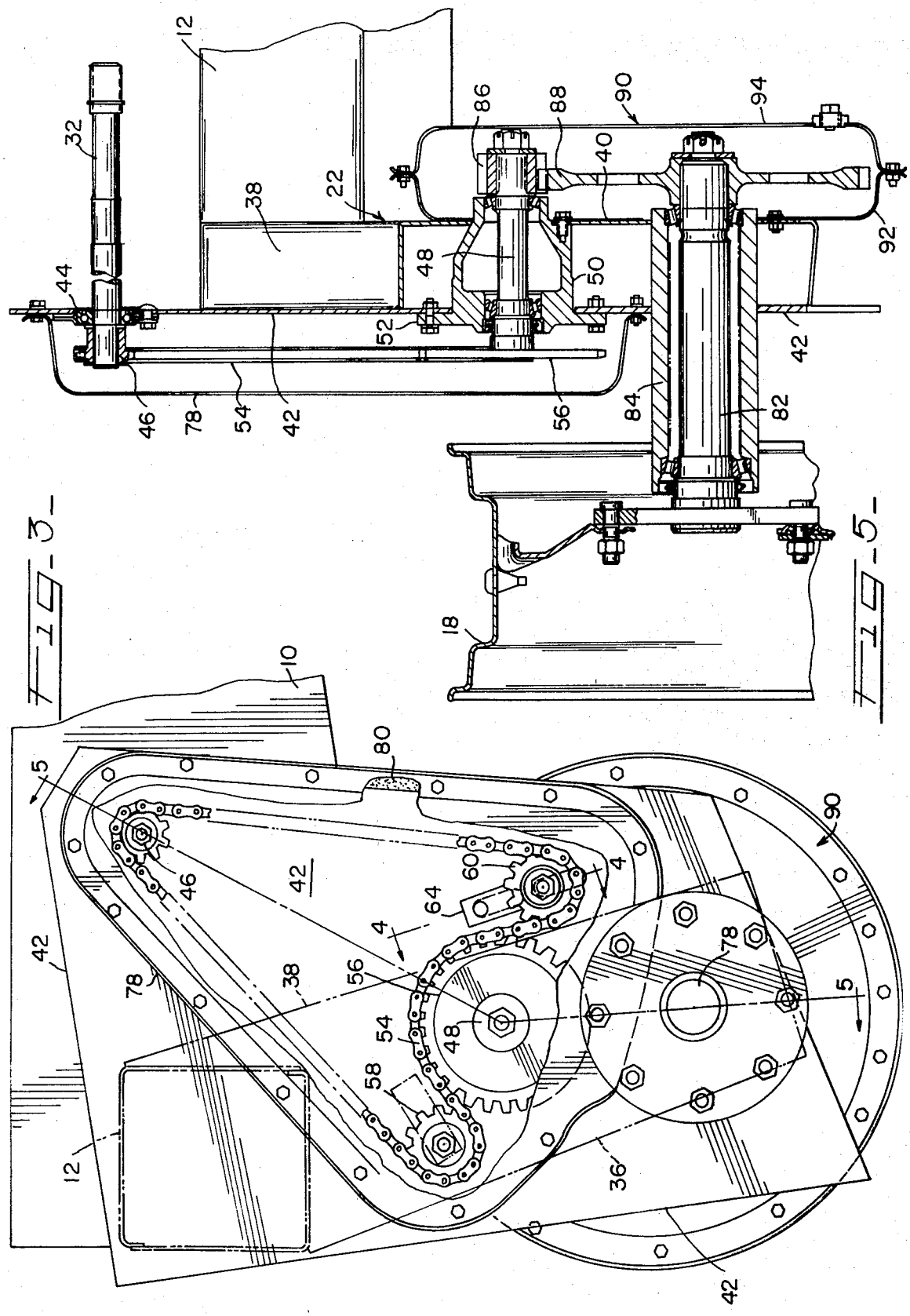

FINAL DRIVE SYSTEM FOR SELF-PROPELLED VEHICLE

BACKGROUND OF THE INVENTION

1. Field of the Invention

The invention relates generally to drive systems for vehicles and more particularly to an improved final drive for the ground drive wheels of the vehicle.

2. Prior Art

Self-propelled chassis for windrowers for example customarily have frame structure which includes a pair of downwardly extending hollow frame sections at the forward end of the chassis on which a respective pair of ground drive wheels are journaled. It is common to dispose the final drive components for the drive wheels within the hollow frame sections to protect the components from external damage. An example of enclosed drive components is shown in U.S. Pat. No. 3,319,493 wherein drive components 44, 45, 48, 51 etc., are disposed within the frame structure defined by the members 10,10 shown in FIG. 3. In some cases the hollow frame sections are designed to provide a lubricant reservoir as well.

While arrangements of the above type may perform satisfactorily throughout normal operation, a problem arises when the final drive components require servicing or replacement due to normal wear. The hollow frame sections are normally constructed of relatively heavy steel plate material. Consequently providing sufficient and convenient access openings into the sections presents design and production difficulties. The result can be considerable difficulty in gaining ready access to the final drive components.

Associated with the foregoing is the problem of disposing the various drive components relative to each other in a compact arrangement. Since the final drive system must porvide speed reduction from the power input to the ground drive wheel, a multitude of components is required. Disposing the many components in an arrangement which simplifies manufacturing, servicing, and repair presents significant difficulties.

SUMMARY

The invention provides an improved final drive system for the ground drive wheels of a self-propelled vehicle having vertically disposed frame sections on which the ground drive wheels are mounted. Certain of the drive components are disposed on the outboard side and on the inboard side of the frame section and are covered by readily removable housings which also define lubricant reservoirs.

The various components of the final drive system are arranged to take advantage of the rigidity and strength provided by the frame sections, without the necessity of being disposed within the frame sections with the attendant difficulties.

It is an object of the invention to provide a final drive system wherein the components thereof are arranged in a compact manner and protected against externally caused damage.

Another object is to provide lubricant reservoirs for components of the drive system.

Another object in conjunction with the foregoing objects is to dispose the drive components in conjunction with a vertical frame section in a manner so as to utilize the strength and rigidity of the frame section without the necessity of disposing the drive components within the frame section itself.

A still further object is to provide a final drive system for which repair and servicing are simplified.

BRIEF DESCRIPTION OF THE DRAWINGS

FIG. 3 is an enlarged fragmentary side elevation view showing a portion of the final drive system;

DESCRIPTION OF THE PREFERRED EMBODIMENT

Figure 1:
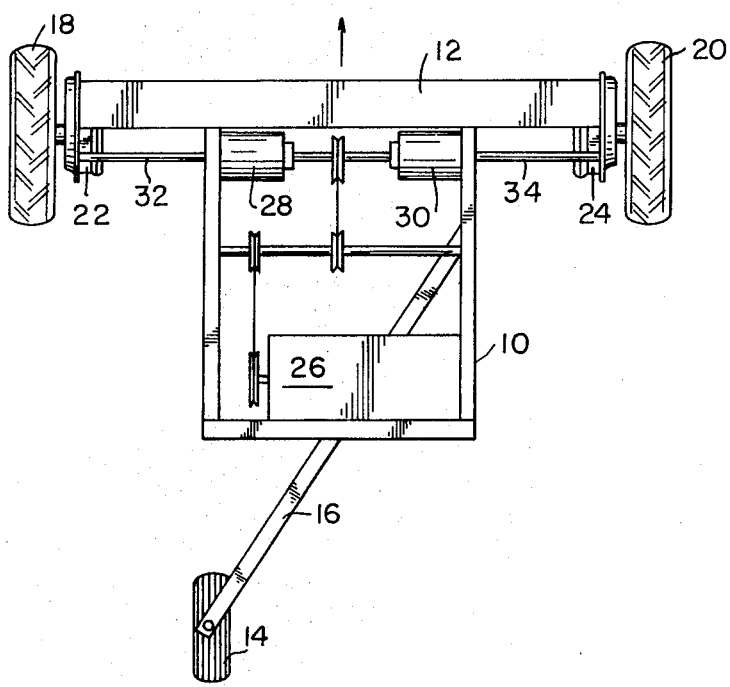
FIG. 1 is a schematic plan view of a self-propelled chassis incorporating the final drive system of the invention.
Figure 2:
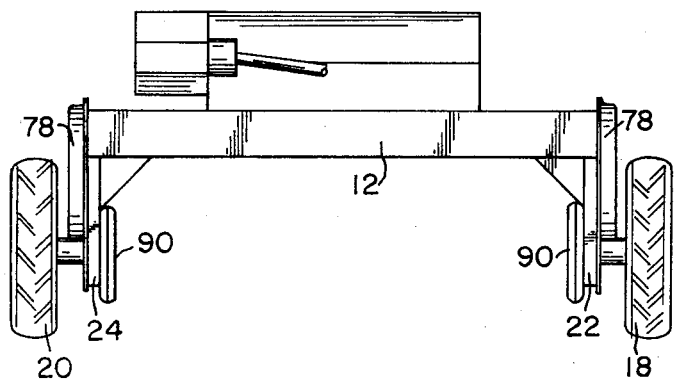
FIG. 2 is a front elevation view of the self-propelled chassis of FIG. 1.

FIG. 1 shows in generally schematic outline the chassis of a self-propelled windrower having a generally rectangular frame section 10 secured to a transverse beam 12 at the forward end of the chassis. The rear of the chassis is supported on a caster type wheel 14 swingably mounted on a tail beam 16 angled rearwardly from the frame section 10. The forward end of the chassis is supported on a pair of wheels 18 and 20 which, in accordance with the invention, are power driven to propel the chassis. As shown in FIGS. 1 and 2 the ground drive wheels 18 and 20 are mounted on the lower ends of a pair of box-type frame sections 22 and 24 respectively extending downwardly from opposite ends of the beam 12.

In accordance with conventional design the windrower chassis may be powered and controlled by means including an engine 26 delivering power to a pair of planetary gear-type transmissions 28 and 30 individually controllable to provide so-called steering-by-driving control of the machine. A pair of shafts 32 and 34 extend outwardly from the transmissions 28 and 30 respectively for transmitting power to the respective drive wheels 18 and 20 through a final drive system of the invention. Since the final drive system from each of the transmissions to each of the ground drive wheels is identical to the other, a description of one will suffice for both.

As shown in FIGS. 3 and 5 the frame section 22 is defined by a front wall 36 and a rear wall 28 extending downwardly and somewhat rearwardly from the beam 12 in parallel realtion. The inboard side of the section 22 is defined by a wall 40 and the outboard side is defined by a plate 42 secured to the end of the beam 12 and to the walls 36 and 38.

The input shaft 32 projects through the plate 42 and is journaled therein by a ball bearing unit 44. A sprocket 46 is secured to the outboard end of the shaft 32 as shown. A shaft 48 projects through the frame section 22 about midway between the top and bottom ends of the section. The shaft 48 is journaled within an annular housing 50 bolted to the wall 40 and plate 42 in fluid-tight relation therewith. It will be seen in FIG. 5 that the greatest diameter portion of the housing 50 comprises a mounting flange 52 disposed against the plate 42. Accordingly the housing 50 is installed and removed from the outboard side of the frame section 22.

Power is transmitted from the sprocket 46 to the shaft 48 by means including a drive chain 54 drivingly engaging a sprocket 56 secured on the outboard end of the shaft 48. As shown in FIG. 3 idler sprockets 58 and 60 are journaled on the outside of the plate 42 on opposite sides of the sprocket 56 so as to dispose the chain 54 to drive the sprocket 56 in the opposite direction to that of the sprocket 46.

Figure 4:
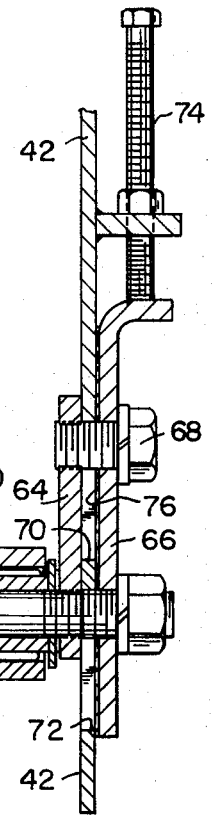
FIG. 4 is a fragmentary sectional view taken in the direction of arrows 4—4 of FIG. 3; and, FIG. 5 is a fragmentary sectional view taken in the direction of arrows 5—5 of FIG. 3.

As shown in FIG. 4 the idler sprocket 60 is adjustably mounted on the plate 42 so as to maintain proper tension on the drive chain 54. The sprocket 60 is journaled on a bolt 62 secured to a pair of straps 64 and 66 disposed on opposite sides of the plate 42. A second bolt 68 assists in retaining the straps 64 and 66 in assembled relation. The bolts 62 and 68 extend through elongated slots 70 and 72 respectively defined through the plate 42. An adjustment bolt 74 is mounted on the inside of the plate 42 in engagement with the strap 66 as shown. Accordingly it will be seen that the position of the idler sprocket 60 may be adjusted. A sheet of gasket material 76 is disposed between the plate 42 and the strap 66 to prevent leakage of fluid through the slots 70 and 72.

The above-described drive components between the shafts 32 and 48 are covered by a sheet metal housing 78 of generally triangular configuration as shown in FIG. 3. The housing 78 is removably bolted to the plate 42 in fluid-tight relation therewith as provided by a strip of gasket material 80 disposed about the periphery of the housing. It will thus be seen that the housing 78 and plate 42 define a reservoir for a suitable lubricant for the enclosed chain drive.

As shown in FIG. 5 the ground wheel 18 is mounted on the outer end of an axle shaft 82 extending through the lower end of the frame section 22. The axle shaft 78 is journaled in a sleeve 84 welded in the wall 40 and plate 42. Power is transmitted from the shaft 48 to the axle shaft 82 through the interengagement of a pinion gear 86 and a bull gear 88 mounted on the inboard ends of the shafts 48 and 82 respectively.

The above-described drive components on the inboard side of the frame section 22 are enclosed in a lubricant housing 90 defined by a pair of annular sheet metal housing sections 92 and 94 bolted together as shown. Suitable gasket materials similar to that shown at 80 in FIG. 3 is disposed between the meeting edges of the sections 92 and 94 and between the section 92 and the wall 40 to provide a fluid-tight reservoir.

In summary, the above described final drive system provides a compact, sturdy arrangement, with ready access for service and repair.

What is claimed is:

1. In a self-propelled vehicle of the type having a pair of vertically disposed box-type frame sections spaced apart transversely to the forward direction of travel of the vehicle, each frame section having an outboard side and an inboard side, a ground engaging drive wheel adapted to be mounted on each frame section, an improved drive system for each drive wheel comprising:

a transverse input shaft having an outer end projecting beyond the outboard side of said frame section;

a driven shaft journaled through said frame section beneath and parallel to said input shaft and having an outer end and an inner end projecting beyond the outboard side and the inboard side respectively of said frame section;

first means drivingly interconnecting the outer ends of said input shaft and said driven shaft so as to be disposed on the outboard side of said frame section;

a first housing detachably secured to the outboard side of said frame section for enclosing said first means therewith;

an axle shaft journaled through said frame section beneath and parallel to said driven shaft and having an outer end and an inner end projecting beyond the outboard and inboard sides respectively of said frame section;

second means drivingly interconnecting the inner ends of said driven shaft and said axle shaft so as to be disposed on the inboard side of said frame section;

a second housing detachably secured to the inboard side of said frame section for enclosing said second drive means therewith; and means mounting said drive wheel on the outer end of said axle shaft so as to be disposed on the outboard side of said frame section.

2. The subject matter of claim 1, wherein said first means comprises a drive sprocket on the outer end of said input shaft, a driven sprocket on the outer end of said driven shaft, and an endless chain trained about said sprockets for drivingly interconnecting the same.

3. The subject matter of claim 1, wherein said second means comprises a pinion gear on the inner end of said driven shaft, and a gear on the inner end of said axle shaft in driven connection with said pinion gear.

4. The subject matter of claim 1, wherein said first means comprises a drive sprocket on the outer end of said input shaft, a driven sprocket on the outer end of said driven shaft, and an endless chain trained about said sprockets for drivingly interconnecting the same; and said second means comprising a pinion gear on the inner end of said driven shaft, and a gear on the inner end of said axle shaft in driven connection with said pinion gear.

5. The subject matter of claim 1, wherein said driven shaft is journaled in an annular housing projecting through said frame section and having its greatest diameter portion outboard of the outboard side of said frame section so as to be mountable on said frame section from the outboard side.

6. The subject matter of claim 1, including means retaining said first and second housings in fluid-tight relation on said frame section, thereby providing lubricant reservoirs for the respective first and second means.

7. The subject matter of claim 2, including means retaining said first housing in fluid-tight relation on said frame section to provide a lubricant reservoir for said drive sprocket, driven sprocket, and chain.

8. The subject matter of claim 3, including said second housing in fluid-tight relation on said frame section to provide a lubricant reservoir for said pinion gear and said gear on said axle shaft.

* * * * *